Patented Feb. 20, 1934

1,947,578

UNITED STATES PATENT OFFICE 1,947,578

INHIBITING THE DECOMPOSITION OF ORGANIC COMPOUNDS

George R. Bond, Jr., Paulsboro, N. J., and Clark W. Davis, Swarthmore, Pa., assignors to E. I. du Pont de Nemours & Company, Wilmington, Del., a corporation of Delaware No Drawing. Application August 28, 1928
Serial No. 302,642

10 Claims. (Cl. 23—250)

This invention relates to a method of improving the appearance and color of liquid organic products, and more particularly to a method of inhibiting the rapid discoloration of such products, which discoloration is significant of slow decomposition.

Considerable difficulties have been experienced heretofore in the discoloration of aniline and similar compounds, particularly on long standing in sunlight. Both heat and sunlight appear to accelerate this discoloration. Sunlight also discolors monomethylaniline and dimethylaniline in a similar manner but to a less degree.

Dr. H. D. Gibbs published in the Philippine Journal of Science 5 A, (1910) pages 9 and 419, two articles regarding the cause of the red coloration in aniline and maintains that this coloration was early attributed to impurities and oxidation. He isolated decomposition products, such as ammonia, benzene, azobenzene, dianilinoquinone, dianilinoquinoneanil, and azophenin. He also found that when moist phenol or aniline were sealed in tubes with nitrogen, hydrogen or carbon dioxide and exposed to sunlight, in less than one month the samples sealed with an indifferent gas became dark red in color, the color being so intense that a layer 0.25 cc. thick appeared black in refracted or transmitted light.

The disclosure in U. S. patent to Ferguson, No. 1,151,255, shows that halogen derivatives of saturated and unsaturated hydrocarbons decompose, corroding the containers in which these hydrocarbons are stored. The containers are attacked by the oxygen absorbed in the liquid. In this patent is also stated that this corrosion can be avoided by adding to the liquid a compound that will combine chemically with the oxygen or hold it physically, thereby preventing it from attacking the metal.

It has been the practice in making other products from liquid amino compounds, such as aniline, to first redistill the compound to remove the color, thereby eliminating the decomposition products.

An object of this invention is to appreciably retard the discoloration of organic liquids, and prevent to a great extent rapid decomposition and the formation of decomposition products.

A further object of this invention is to remove the dissolved oxygen from an organic liquid, and replace this oxygen with a gas which will retard the rate of decomposition of the liquid.

Other objects will appear as the description proceeds.

It has been the belief for some time that the presence of small quantities of nitrobenzene caused the red discoloration so common in aniline. But it was found that when pure aniline was placed in the sunlight it discolored almost as rapidly as when traces of nitrobenzene were present. This led to the conclusion that sunlight was the cause of the discoloration.

However, when pure aniline is placed in the dark, free from any light whatever, it discolors, yet not as rapidly as when exposed to the sun's rays. This illustrated that there was some other cause for the discoloration or decomposition of the aniline.

Various experimenters have found that moisture-free air has the following approximate composition by volume:—

| | Percent |
|---|---|
| Oxygen | 20.92 |
| Nitrogen | 78.14 |
| Carbon dioxide | 0.04 |
| Argon, etc | 0.90 |

We have found, however, that aniline at room temperature dissolves 2.7 percent by volume of air and the gas removed from freshly distilled aniline, that has a so-called "water-white" color contains:—

| | Percent |
|---|---|
| Oxygen | 35.2 |
| Nitrogen | 64.8 |

It will be apparent from the foregoing that the oxygen content of the removed gas is higher in oxygen than the original air, and that the dissolved air has approximately the same composition as the gas that is removed from saturated water.

We have found that one liter of aniline at ordinary temperature (30° C.) dissolves approximately 1.3 liters of carbon dioxide, while the same quantity of aniline will dissolve 35 cc. of nitrogen. We have also found that on long standing in iron drums carbon dioxide reacts with aniline and the iron from the drum, forming a precipitate in the solution. Sulphur dioxide also reacts with the aniline. Hydrogen sulphide bleaches aniline but it has the disadvantage that the sulphur is precipitated on standing and also has the further disadvantage in that the odor is objectionable. Hydrogen alone would be quite satisfactory for replacing the oxygen in these amino compounds but it has the disadvantage in that it produces an explosive hazard.

In carrying out our invention, we may remove the dissolved oxygen from the liquid by heating the liquid, subjecting it to a reduced pressure, or replacing the dissolved gas with an indifferent gas by bubbling the latter gas into the liquid. It will be understood, however, that these methods are illustrative only and that other well known means of gas saturation may be used without departing from the spirit of our invention.

Although we have disclosed in the foregoing that our invention is specifically applicable to aniline it will be understood, of course, that it is similarly applicable to all organic liquids which are acted upon by gaseous oxygen. Other organic liquids in which we have discovered that the discoloration is retarded by the displacement of the dissolved oxygen with nitrogen are:—monoethylaniline, orthotoluidine, o and p-xylidines, di-methylaniline, o-anisidine and p-phenetidine. We have also found that when the dissolved oxygen in ethylaniline and di-methylaniline is replaced with nitrogen the yellow color is removed and the product is water-white, and that the yellow color reappears if oxygen is blown through these liquids. This yellow color can again be removed by blowing nitrogen through the liquids.

It will be understood that we do not intend to be limited to the particular illustrations nor to the particular compounds specifically mentioned, as our invention is applicable to many groups of organic liquids. As many apparently widely different embodiments of this invention exist and may be practiced without departing from the spirit thereof, we do not wish to be limited except as indicated in the appended claims.

We claim:

1. A method of inhibiting the rapid discoloration of a liquid amino compound which comprises saturating the liquid with a non-oxidizing gas.
2. A method of inhibiting the rapid discoloration of an aniline compound which comprises replacing the absorbed oxygen with nitrogen.
3. A method of inhibiting the rapid decomposition of aniline which comprises replacing the dissolved air therein with nitrogen.
4. A relatively light-stable organic liquid comprising an aromatic amine from which the dissolved oxygen has been displaced by an inert gas.
5. A relatively light-stable organic liquid comprising an aromatic amine from which the dissolved oxygen has been displaced by nitrogen gas.
6. A method of inhibiting the rapid discoloration of a liquid organic compound which comprises removing the dissolved gases and confining said compound out of contact with an appreciable quantity of an oxygen containing gas.
7. The process of treating alkylanilines which comprises displacing the dissolved gases therein by nitrogen gas.
8. The process of claim 7 in which the alkylaniline is toluidine.
9. The process of claim 7 in which the alkylaniline is ethyl aniline.
10. The process of claim 7 in which the alkylaniline is dimethyl aniline.

GEORGE R. BOND, Jr.
CLARK W. DAVIS.